United States Patent
Dix

(10) Patent No.: US 9,575,605 B2
(45) Date of Patent: *Feb. 21, 2017

(54) INPUT DEVICE FOR TOUCH-SENSITIVE, CAPACITIVE DISPLAYS

(71) Applicant: STAEDTLER Mars GmbH & Co. KG, Nürnberg (DE)

(72) Inventor: Rilke Dix, Bamberg (DE)

(73) Assignee: STAEDTLER MARS GMBH & CO. KG, Nürnberg (DE)

(*) Notice: Subject to any disclaimer, the term of this patent is extended or adjusted under 35 U.S.C. 154(b) by 116 days.

This patent is subject to a terminal disclaimer.

(21) Appl. No.: 14/402,972

(22) PCT Filed: May 4, 2013

(86) PCT No.: PCT/EP2013/001318
§ 371 (c)(1),
(2) Date: Nov. 21, 2014

(87) PCT Pub. No.: WO2013/178316
PCT Pub. Date: Dec. 5, 2013

(65) Prior Publication Data
US 2015/0169106 A1 Jun. 18, 2015

(30) Foreign Application Priority Data
May 29, 2012 (DE) .......................... 10 2012 010 965

(51) Int. Cl.
*G06F 3/041* (2006.01)
*G06F 3/044* (2006.01)
(Continued)

(52) U.S. Cl.
CPC .............. *G06F 3/044* (2013.01); *B43K 7/005* (2013.01); *B43K 19/003* (2013.01); *B43K 19/02* (2013.01);
(Continued)

(58) Field of Classification Search
CPC ........ A45D 40/20; B43K 19/02; B43K 29/00; B43K 23/00; B43K 25/00; B43K 29/02;
(Continued)

(56) References Cited

U.S. PATENT DOCUMENTS 6,168,732 B1 * 1/2001 Ardakani ............... C08G 61/02
252/500
8,188,175 B2 5/2012 Lins et al.
(Continued)

FOREIGN PATENT DOCUMENTS

CH          696636 A5    8/2007
DE      202005021251 U1  7/2007
(Continued)

*Primary Examiner* — Nelson Rosario
(74) *Attorney, Agent, or Firm* — Lucas & Mercanti, LLP; Klaus P. Stoffel

(57) ABSTRACT

The invention relates to an input device 1 for capacitive touch-sensitive displays, wherein the device is a simple pen 11, wherein the simple pen can be sharpened, wherein the device is present as a core, or wherein the device is present as a core with a coating, or wherein the device is present as a core with a casing, or wherein the device comprises a core, a casing and a coating, wherein the core, the casing and/or the coating are configured to be electrically conductive, wherein an element, a contacting element 12 for a tablet/display is formed at one end of the device, and wherein the contacting element is formed as an electrically conductive material.

9 Claims, 1 Drawing Sheet

(51) Int. Cl.
- *G06F 3/039* (2013.01)
- *G06F 3/0354* (2013.01)
- *B43K 19/00* (2006.01)
- *B43K 19/02* (2006.01)
- *B43K 19/14* (2006.01)
- *B43K 19/16* (2006.01)
- *B43K 19/18* (2006.01)
- *B43K 23/016* (2006.01)
- *B43K 29/00* (2006.01)
- *B43K 29/02* (2006.01)
- *B43K 29/18* (2006.01)
- *B43L 19/00* (2006.01)
- *B43K 7/00* (2006.01)
- *A45D 40/20* (2006.01)

(52) U.S. Cl.
CPC ............. *B43K 19/14* (2013.01); *B43K 19/16* (2013.01); *B43K 19/18* (2013.01); *B43K 23/016* (2013.01); *B43K 29/00* (2013.01); *B43K 29/02* (2013.01); *B43K 29/18* (2013.01); *B43L 19/0025* (2013.01); *B43L 19/0075* (2013.01); *G06F 3/039* (2013.01); *G06F 3/03545* (2013.01); *G06F 3/041* (2013.01); *A45D 40/20* (2013.01); *G06F 2203/04103* (2013.01)

(58) Field of Classification Search
CPC ..... B43K 29/08; B43K 31/00; G06F 3/03545; G06F 3/039; G06F 3/041; G06F 3/044; G09G 3/3607; G09G 2320/0242; G09G 3/3648
USPC ........ D11/411; D19/115–186, 190–204, 904, D19/908, 918; 24/11 F, 11 P, 11 R; 401/52, 99, 192, 195, 196; 345/173–184; 178/18.01–20.04
See application file for complete search history.

(56) References Cited

U.S. PATENT DOCUMENTS

| | | |
|---|---|---|
| 2006/0018936 A1 | 1/2006 | Appel et al. |
| 2008/0266267 A1 | 10/2008 | Chang |
| 2011/0164000 A1* | 7/2011 | Pance ................. G06F 3/03545 345/179 |
| 2011/0249007 A1* | 10/2011 | Kuster ................. G06T 11/203 345/441 |
| 2012/0086664 A1* | 4/2012 | Leto ....................... B43K 29/00 345/174 |
| 2014/0044470 A1* | 2/2014 | Jewson ................. B43K 29/00 401/195 |

FOREIGN PATENT DOCUMENTS

| | | |
|---|---|---|
| DE | 102008034013 A1 | 1/2010 |
| EP | 1585016 A1 | 10/2005 |
| WO | 2011008533 A2 | 1/2011 |

* cited by examiner

INPUT DEVICE FOR TOUCH-SENSITIVE, CAPACITIVE DISPLAYS

The present application is a 371 of International application PCT/EP2013/001318, filed May 4, 2013, which claims priority of DE 10 2012 010 965.2, filed May 29, 2012, the priority of these applications is hereby claimed and these applications are incorporated herein by reference.

BACKGROUND OF THE INVENTION

The invention relates to an input device for so-called capacitive touch-sensitive displays, and to the use thereof.

Input devices for displays of this kind are known in principle.

For example, input styluses are known, which consist of an electrically conductive shaft, wherein a soft, conductive, elastically formed contact plug for the display/display surface is formed at one end thereof.

With such input pens it is disadvantageous that they are too expensive for use as purely an input pen and moreover, do not have a writing or application function.

Further, input pens are known, which at one end comprise writing utensil or applicator and at the other end, an electrically conductive arrangement in the form of a contact plug, which when the capacitive display is touched permits or triggers an input function.

The known input pens mentioned above, however, have a number of disadvantages.

For example, the manufacture of such pens is expensive. Almost all of these input pens according to the state of the art are present as ball point pens, which means that the user has not much to choose from.

SUMMARY OF THE INVENTION

It is therefore the requirement of the invention to propose an input device which does not have the disadvantages mentioned in the beginning and moreover, can be manufactured at very reasonable cost. Furthermore it is a requirement of the invention that the input device continues to be available to users in the accustomed way as a fully-fledged writing, drawing, painting or cosmetics device.

The input device according to the invention is present as a simple writing, drawing, painting, cosmetics or erasing device which can be sharpened and which at least consists of one core for producing markings etc.

The devices encompassed thereby may be, for example, solid core pens or cores encased in wood, plastic and/or a wood substitute (WPC). The core may be present as a lead, colour, cosmetics or eraser core.

Further, it is unimportant whether the solid core pen or the encased core additionally comprises a coating or alternative decorative top layer, for example in the form of a foil.

Surprisingly it was found to be possible to use such a simply constructed and cost-effective device as an input device if the core material and/or the core casing and/or the coating of the sharpenable device is/are configured so as to be conductive by adding conductive constituents or additives to the core, the core casing and/or the coating.

Sharpenable devices, as described above, are understood to include devices, which the user can sharpen or re-sharpen using a commercially available sharpener, a manual sharpener or other sharpening devices in order to maintain their usefulness.

With devices with a core encased in wood substitute the wood substitute may consist of a plastic or so-called wood plastic compound (WPC). Such devices/casings or parts for the casings are manufactured by an extrusion process or a co-extrusion or injection moulding process.

The device may also comprise a core which is not colour-releasing. The core may, for example, be a so-called eraser pen consisting of a solid erasing core or core/strand with a casing. In this case too, the erasing material and/or casing is mixed with substances/additives as already mentioned, whereby the erasing material comprises conductive properties.

As mentioned, the core and/or core casing and/or coating must be implemented so as to be conductive, as described below by way of example.

It is known in the art that almost any standard plastic or plastic-containing material can be made conductive by the addition of certain additives. These additives are in themselves electrically conductive. Additives of this kind may, for example, be graphite, carbon fibre, conductive soot, metal fibres, "carbon nano tubes", copper pigments, silver-plated copper pigments and/or silver powder.

In order to render the core, the casing, the coating and/or the elements conductive, so-called anti-static agents may be added to the materials thereof. Anti-static agents have the effect preventing or weakening the static charge of objects. In this respect a difference must be made between internal and external anti-static agents. Such agents may, for example, be incorporated internally as metal wires or deposited externally as a metal powder by vaporisation.

An example for a conductive casing is a conductive wood substitute, known as wood plastic compound (WPC) from the DE 102008034013 A1 (state-of-the-art), and which can be made conductive through the addition of graphite powder in an amount of 5 to 50 percent by weight, preferably at least 10 to 40 percent by weight.

The wood substitute material according to the state of the art is made up of the following constituents:
15-30 percent by weight of at least one polymeric binding agent,
50-80 percent by weight of at least one organic filler,
0-20 percent by weight of at least one inorganic filler,
0.5-5 percent by weight of at least one bonding agent,
1-30 percent by weight of at least one wax
0-10 percent by weight of at least one colour pigment and
0-10 percent by weight of at least one inorganic additive An actual exemplary embodiment for the wood substitute based on polyolefin is composed as follows:
60 percent by weight wood flour
12 percent by weight graphite
4 percent by weight wax (amid wax)
2 percent by weight inorganic additive (stearic acid)
21 percent by weight polyolefin
1 percent by weight bonding agent (polypropylene grafted with maleic anhydride.

Surprisingly it was found to be convenient that the addition of the conductive additive did not limit the sharpening capability with commercially available sharpeners. A so-called sharpening moment of less than 10 Ncm was maintained.

All customary properties of known so-called wood encased pens are upheld without restrictions.

If instead of WPC a pure plastic is used as encasing material the plastic also has to have a conductive additive added to it. Standard plastics have an electrical resistivity of approx. $10^{14}$ ohm. By adding additives in order to achieve conductivity this value can be lowered down to $10^2$ ohm.

A conductive plastic is, for example, the commercial product called GraviTech GRV PP-0030-IO Black FD by Messrs. POLYONE.

The cores may be implemented as lead, colour, eraser or cosmetic cores or chalks.

A conductive lead core as known to the expert from the state of the art may consist of the following:

| | |
|---|---|
| Graphite | 50% by weight |
| Clay | 40% by weight |
| Additive | 1% by weight |
| Impregnation | 9% by weight |

As an example a polymer-bound graphite core shall also be mentioned such as used, for example, in commercially available solid core pens.

| | |
|---|---|
| Graphite | 70% by weight |
| Polymer (PS) | 20% by weight |
| Additive | 1% by weight |
| Wax | 9% by weight |

As an example for a conductive blue colour core the following composition may be mentioned. In this case silver-plated copper pigments are the conductive additive,

| | |
|---|---|
| 1.5% by weight | pigment blue |
| 39% by weight | boron nitride |
| 16% by weight | silver-plated copper pigments |
| 5% by weight | calcium stearate |
| 7% by weight | stearic acid |
| 5% by weight | carboxymethyl cellulose |
| 8% by weight | mica |
| 16.5% by weight | soapstone |

In order to make conventional eraser cores or eraser tips conductive these may have graphite added to them.

A general formula for a conductive eraser compound may be, for example:

| | |
|---|---|
| Polymer | 15 to 90% by weight |
| Inorganic fillers | 0 to 80% by weight |
| Oils | 0 to 10% by weight |
| Graphite | 10 to 50 % by weight |

The polymers used in this case may be from SEBS, SBS, EPDM/PP or mixtures therefrom, and/or with polyolefins, acrylates or PUR.

Classic fillers are chalk, talcum and/or kaolin.

As an example for a conductive cosmetics core an eyeliner core may be mentioned, which is composed of:

| | |
|---|---|
| 8% by weight | lithium stearate |
| 20% by weight | isopropyl myristate |
| 11% by weight | hydrogenated palm kernel glycerides |
| 45% by weight | pigment blue |
| 0.5% by weight | pantenol |
| 0.5% by weight | propylparaben |
| 15% by weight | silver powder. |

This formula is a modified formula according to the DE 202005021251 U1, wherein conductivity was achieved by adding/incorporating silver powder.

Coatings are understood to be thin colour or lacquer coatings or thin foil coatings which mainly serve decorative or surface-sealing purposes.

An example for a conductive coating of lacquer has the following constituents:

| | |
|---|---|
| Nitrocellulose | 18% by weight |
| Softener | 6% by weight |
| Resins | 6% by weight |
| Acrylate | 6% by weight |
| Graphite | 12% by weight |
| Anorganic fillers | 20% by weight |
| Organic additives | 0.5% by weight |
| Solvent (VOC) | rest of 100% by weight |

Foil coatings also can possess or comprise conductivity. As an example the product called "Alufin" by Messrs Kurz may be mentioned. This is an embossing foil metallised with aluminium.

At the end opposite the writing tip the pen comprises an element for contacting the tablet PC or display, wherein the element is constructed from a conductive material, and wherein an electrically conductive contact/connection is formed between the element and the conductive core, the conductive casing and/or the conductive coating.

Alternatively a dielectric may be formed between the element and the core, the casing and/or the coating.

The element may be detachably or non-detachably connected with the pen, in case of a detachable connection, if the pen is worn down, the contacting element may be used on another pen, which for the user means a further cost advantage.

It is also of advantage, should the contacting element be defective due to frequent or inappropriate use, if this can be replaced by a new element rather than having to replace the entire pen.

An example for a detachable connection is a plug-in connection, where the internal, diameter of the mounting of the contacting element is configured smaller or slightly smaller than the external diameter of the pen end, in order to ensure a secure hold or fit when fitting the element onto the end.

The contacting element, as known from the art, frequently consists of a rubber-like, elastic and/or foam-type constructed material to which additives have been added for achieving conductivity.

It was found that a so-called eraser tip also, as well known from the state of the art, can be configured to be conductive and serve as an element. In this embodiment the eraser tip, apart from its function of erasing markings, also assumes a contacting function for the display of the tablet.

Eraser tips according to the state of the art are frequently set in metal sleeves, wherein the sleeves are non-detachably attached to the end of the pen by crimping.

Surprisingly it was also found that between the conductively implemented core, casing and/or coating and the hand of the user, there need not be any direct contacting or uninterrupted conductive transition. It is perfectly possible to have a line break in the form of a dielectric, wherein a sort of capacitor element is formed which produces a sufficiently large charge displacement when the user contacts the display with the input device in order to trigger an input function on the tablet.

As an example an input device may be mentioned in this respect, in which both core and casing are conductive, but the thin lacquer coating is not. The input function is effective without restriction.

The same applies to the connection between contacting element and conductive core, casing and/or coating, wherein the function of the input device is not adversely affected if there is a line break in the form of a thin gap or distance. As a result of the dielectric formed in this way, a charge displacement ensues which is sufficient to trigger in input function.

BRIEF DESCRIPTION OF THE DRAWING

The invention will now explained in detail with reference to the FIGS. 1 to 3.

DETAILED DESCRIPTION OF THE INVENTION

Figure 1:
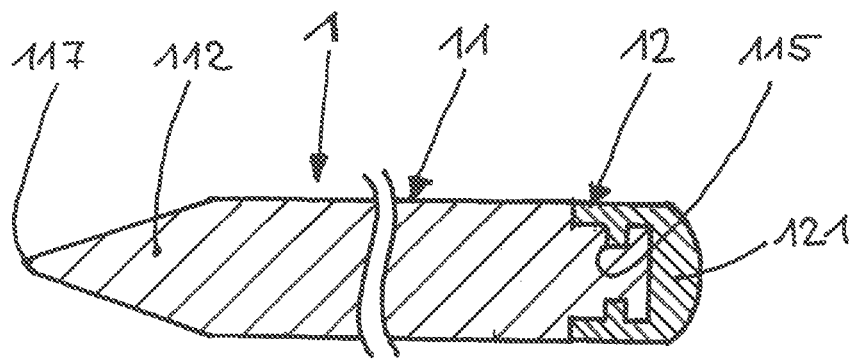
FIG. 1: input device consisting of a core with adapted contacting element.

FIG. 1 shows an input device 1 configured as a solid core pen 11. The core 112 in this embodiment extends across the entire cross-section of the pen 11. At the opposite end to the writing tip 117 of the device a contacting element 12 is arranged. The contacting element 12 is retained by means of an undercut connection/projection 115. In this embodiment the core 112 and the contacting element 12 are configured as a foam/rubber body or as a rubber-elastic body 121 and so as to be electrically conductive. In the example not shown the user contacts the surface of the tablet with the input device thereby creating an electrically conductive connection between the tablet and the hand of the user. This leads to a charge displacement, thereby triggering an input function on the tablet or tablet-PC.

Using a contacting element 121 means that the surface of the tablet is treated with care, insofar as measures have been taken to prevent scratching, for example. But it also means that the contact surface between the element 121 and the tablet is enlarged because the element, due to its flexibility, moulds itself against the tablet.

Moreover due to the damping characteristics of the element 121 the input noise is reduced and the force per surface unit acting upon the surface of the display is also reduced.

Figure 2:
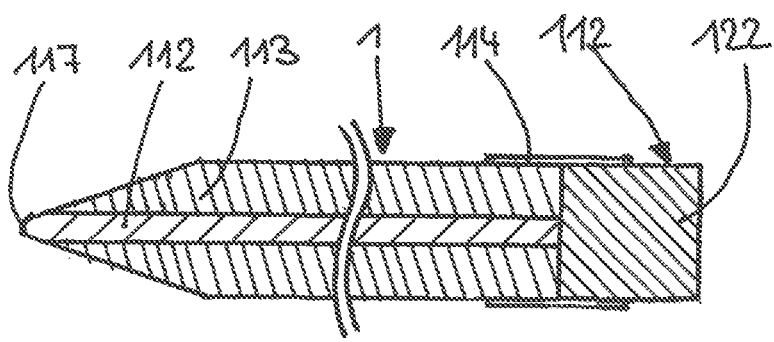
FIG. 2: input device consisting of a core, a core casing and an eraser tip.

FIG. 2 shows and describes an alternative embodiment of the input pen 1, which comprises a core 112 with a casing 113. At the opposite end of the writing tip 117 a contacting element 12 is formed in the shape of an eraser tip 122, wherein the eraser tip 122 is electrically conductive. The eraser tip 122, as well known from the state of the art, is retained by means of a metal sleeve 114 securely mounted against slip on the casing 113 and which also holds the eraser tip. The eraser tip 122, casing 113 and/or cores 112 are in conductive contact. In this embodiment both core 112 and casing 113 are configured so as to be conductive.

Figure 3:
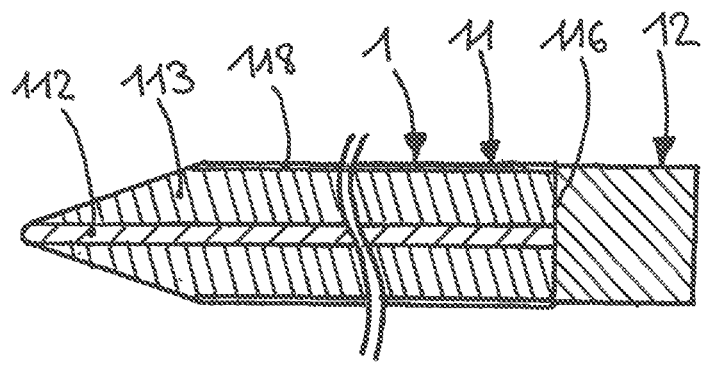
FIG. 3: input device consisting of a core with a core casing as well as a coating.

In FIG. 3 an input device 1 is shown, which comprises a core 112 with core casing 113 and a coating 118. In the embodiment shown the casing 113 and the core 112 are configured so as to be electrically conductive. The thin coating 118 can be, but need not be, electrically conductive. In case the coating 118 is not configured so as to be electrically conductive, capacitor/dielectric is formed, in an application not shown, between the hand of the user and the input device 1. Since with thin coatings 118 the capacity is very high, the charge displacement when contacting the tablet is sufficient for achieving or triggering an input function.

The input device 1 according to FIG. 3 is provided with a contacting element 12. The contacting element 12 is attached to the pen 11 by means of an adhesive layer 116.

As an alternative to a contacting element the input device may be provided with a gliding lacquer at the end opposite to the writing tip in order to achieve easy and pleasant gliding on the surface of the tablet. In this case also it should be mentioned that the thin coating of gliding lacquer need not be, but of course can be, configured so as to be conductive.

These input devices are intended for use on capacitive, touch-sensitive displays so-called tablet computers or smart phones. The device is a simple pen, wherein the simple pen can be sharpened, wherein the device is present as a core, or wherein the device is present as a core with a coating, or wherein the device is present as core with a casing, or wherein the device comprises a core, a casing and a coating. The core, the casing and/or the coating are configured so as to be electrically conductive. An element, a contacting element for a tablet/display, is formed at one end of the device, wherein the contacting element consists of an electrically conductive material.

The core, the casing, the coating and/or the elements comprise conductive constituents or additives, wherein these additives are present in the form of graphite, carbon fibre, conductive soot, metal fibres, "carbon nano tubes", copper pigments silver-plated copper pigments and/or silver powder.

ITEM LIST 1 input device
11 simple pen
112 core
113 casing
114 metal sleeve
115 undercut projection
116 adhesive layer
117 writing tip
118 coating
12 contacting element
121 foam/rubber body
122 eraser tip

The invention claimed is:

1. An input device for a capacitive touch-sensitive display, wherein the device is a sharpenable stylus that is a writing, drawing or painting device, wherein the device comprises: a core or a core with a casing, the core is configured as an electrically conductive lead or colour core; an element formed at one end of the device as a contacting element for the display, wherein the contacting element is configured as an electrically conductive material for activating a capacitive touch-sensitive display, wherein the casing is made of wood, plastic and/or wood substitute; and, an electrically conductive contact or a dielectric formed between the element and the electrically conductive core.

2. The device according to claim 1, wherein the core and/or the casing comprise conductive constituents or additives, wherein the additives are at least one of the group consisting of: graphite, carbon fibre, conductive soot, metal fibres, carbon nano tubes, copper pigments, silver-plated copper pigments and/or silver powder.

3. The device according to claim 1, wherein the core, the casing and/or the element comprise anti-static agents as additives.

4. The device according to claim 1, wherein the element is configured so as to be detachably connected with the sharpenable stylus.

5. The device according to claim 1, wherein the element is configured so as to be non-detachably connected with the sharpenable stylus.

6. The device according to claim 1, wherein the element is configured as an eraser or an eraser tip.

7. An input device for a capacitive touch-sensitive display, wherein the device is a sharpenable stylus that is a writing, drawing or painting device, the device comprising: a core that is an electrically conductive lead or colour core; a contact element for the display, the contact element being formed at one end of the device and being electrically conductive for activating a capacitive touch-sensitive display; and an electrically conductive contact or a dielectric formed between the element and the electrically conductive core, wherein the casing is made of wood, plastic and/or wood substitute, and wherein the core, the casing and/or the element comprise anti-static agents as additives.

8. The device according to claim 7, and further comprising a coating on the core.

9. The device according to claim 7, and further comprising a coating on the casing.

\* \* \* \* \*